Sept. 30, 1969        G. MERSCH        3,469,460
PHASE DISPLACEMENT DEVICE OF TWO SHAFTS
Filed Aug. 15, 1968        2 Sheets-Sheet 2
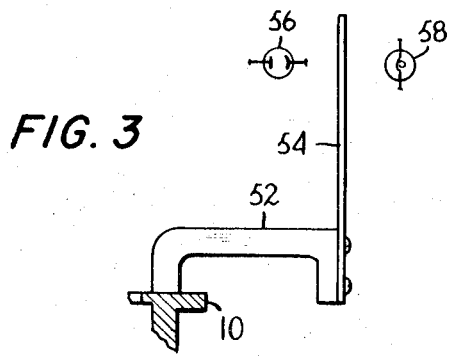
FIG. 3
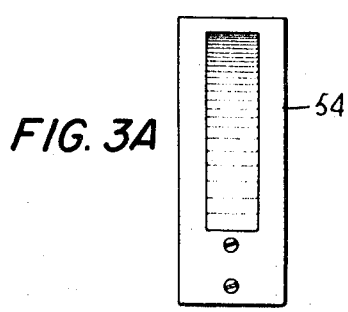
FIG. 3A
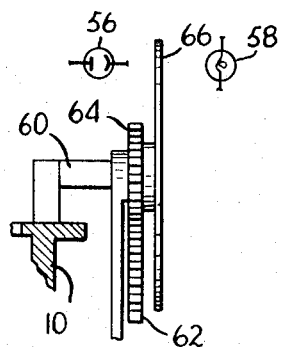
FIG. 4
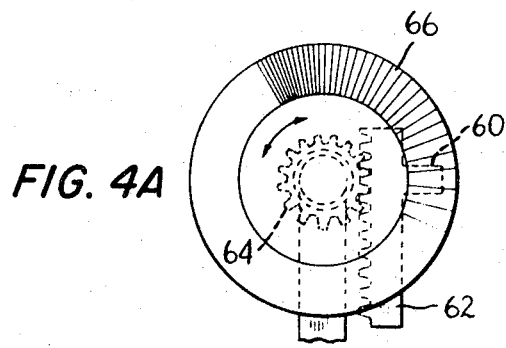
FIG. 4A
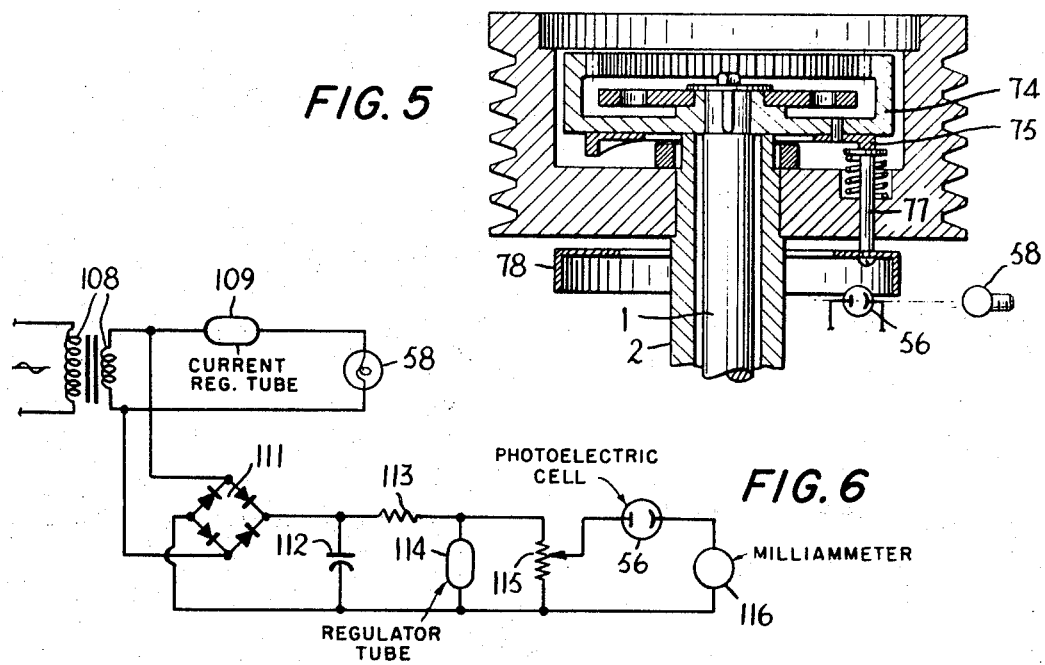
FIG. 5
FIG. 6

United States Patent Office 3,469,460
Patented Sept. 30, 1969

3,469,460
PHASE DISPLACEMENT DEVICE
OF TWO SHAFTS
Georges Mersch, 18 Rue Franz Liszt,
Luxembourg, Luxembourg
Continuation-in-part of application Ser. No. 508,311,
Nov. 17, 1965. This application Aug. 15, 1968, Ser.
No. 752,830
Claims priority, application Luxembourg, Nov. 24, 1964,
47,431; Oct. 7. 1965, 49,650
Int. Cl. F16h 25/12, 29/20
U.S. Cl. 74—57　　　　　　　　　　　　　　　9 Claims

ABSTRACT OF THE DISCLOSURE

The phase relation between two concentric shafts normally rotating together is shifted, to perform a control function, by rollers on an axially slidable hub on one shaft received in helical grooves in a bell-shaped skirt fixed on the other shaft. The phase relation between the shafts is indicated by a mechanical indicator or by a photo-electric indicator.

---

This application is a continuation-in-part of application Serial No. 508,311 filed November 17, 1965, now Patent Number 3,405,571.

Many apparatuses comprise a device enabling modification of their characteristics while they are rotating. This applied particularly to aeroplane propellers, hydraulic turbine rotos, ventilators or pumps, and mixers or dispensers. Generally, the relative operating motion is obtained by the axial displacement of a component disposed on the rotating shaft, said component remaining stationary and unrotating relative to the rotating shaft because it is mounted on a device such as a bearing which carries the axial thrust during said axial displacement. Said axial movement is then directly utilized or converted into relative rotation of the drive shaft by any of the numerous known devices such as: helical grooves, sets of levers, rack and pinion with conical gears, helical gears. But experience has shown that such axial displacement devices generate axial thrusts which may be important and complicate the conception and execution of the bearing brackets. Furthermore, they often require special balancing precautions, particularly when the basic rotation is fast.

The present invention aims at creating a relative motion device, which is hereinafter termed "dephasing motion" or "dephasing," that is to say a modification of the peripheral speed of two shafts, preferably rotating, concentric and under power load, through an adjustable peripheral action, that is to say positive, negative or nil, permanent or temporary, producing directly or indirectly the desired effect, whether there be required a relative rotation or a final axial motion, and this without axial thrust.

The device of the present invention may be adapted to a multitude of apparatuses of which it is desired to modify certain characteristics while in operation. As examples may be mentioned axial and centrifugal ventilators, axial and centrifugal pumps, aviation and marine propellers, machine-tools, mixers and kneaders for all industries, axial or centrifugal compressors, hydraulic turbines.

In the following text shall be distinguished the following motions (a) basic movement corresponding to the rotation of the aggregate, such movement transmits in principle the power of the machine to the active component (impeller, propeller, etc.) although from a power viewpoint the functions of the different components may be inverted; (b) operating motion applying to the displaced shaft a motion relative to the basic movement. Said operating motion could be a translatory motion or a rotation with relation to basic movement; (c) drive motion which is the translatory motion which induces the operating motion.

The operating motion should normally be very slow, as the relative motion of the adjustment component with relation to shaft is slow. The drive motion is derived from any convenient exterior source. If the drive motion is slow, it may be assimilated to the operating motion. Means is provided for indicating the phase displacement of the shafts relative to one another and thereby indicating the condition of the mechanism driven and controlled by the shafts.

The invention will be more fully understood from the following description in conjunction with the accompanying drawings in which:

FIGS. 3 and 3a are side and front views respectively of a second indicating means;

FIGS. 4 and 4a are side and front views of a third indicating means;

FIG. 5 is a side view in cross-section of a fourth indicating means; and

FIG. 6 is a diagram of an indicating circuit for use in the above indicating means.

Figure 1:
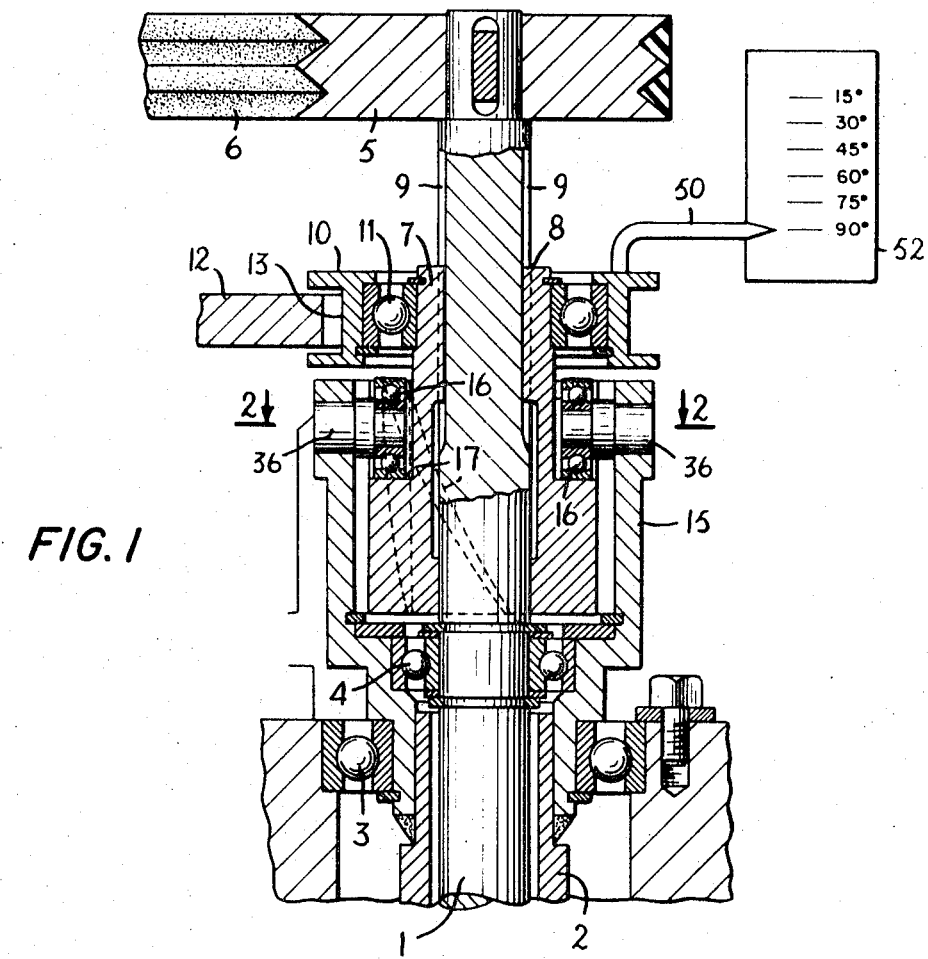
FIG. 1 is an elevational view partially in cross-section of one embodiment with one particular indicating device.
Figure 2:
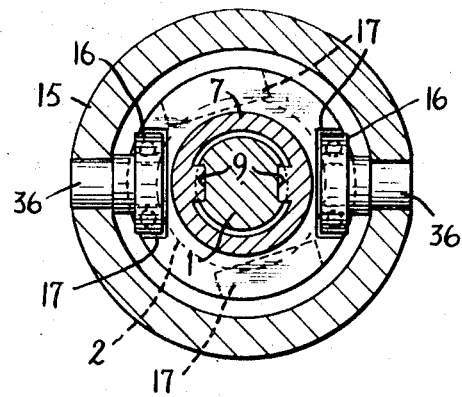
FIG. 2 is a top view partially in cross-section taken along the lines 2—2 of FIG. 1.

In the embodiment of the invention shown by way of example in FIGS. 1 and 2, in the inner shaft 1 and outer shaft 2 are arranged concentrically with one another. The outer shaft is rotatably supported by a bearing 3 while the inner shaft is rotatably supported inside the outer shaft by a bearing 4. A variable impeller, propeller, rotor or other device to be driven (not shown) is mounted on the lower ends of the shafts 1 and 2. The shafts normally rotate together at the same speed but can be shifted angularly relative to one another as described below in order to perform a control function on the impeller or other driven device.

The inner shaft 1 is driven by a pulley 5 which is keyed on the upper end of the shaft and is driven from a suitable motor (not shown) for example by multiple V-belts 6. A hub 7 is axially slidable on the inner shaft 1 but is constrained to rotate therewith, for example by the engagement of ribs 8 inside the hub engaging in axially extending grooves 9 in the periphery of the inner shaft 1. The hub 7 is movable axially on the shaft by means of a collar 10 which is mounted on the upper end portion of the hub by a bearing 11 which permits relative rotation of the hub and the collar while they are movable together in an axial direction. The collar 10 and hence the hub 7 are movable axially by any suitable control means, for example a forked lever 12 which engages an annular groove 13 in the periphery of the collar.

A bell-shaped skirt 15 is fixed to the upper end of the other shaft 2 and surounds the hub 7 of the inner shaft. Symmetrically arranged the rollers 16 on the inside of the skirt 15 are received in helically extending grooves 17 provided in the outer periphery of the hub 7. The rollers 16 are shown as the outer races of ball bearings mounted on shafts 36 which are carried by the skirt 15 and extend radially inwardly.

With the arrangement described, it will be seen that when the inner shaft 1 is driven by the pulley 5, the outer shaft 2 is driven by the engagement of the rollers 16 carried by the skirt portion 15 of the outer shaft engaging in the grooves 17 in the hub 7 which rotates with the inner shaft. As long as the hub 7 remains in the same vertical position, the two shafts 1 and 2 rotate together at the same speed. If, however, the hub 7 is moved in a vertical direction by means of the collar 10 and lever 12, the angular relation of the two shafts relative to one another will be varied by reason of the inclination of the helical grooves 17. The amount of angular movement is determined by the vertical distance the hub 7 is moved and by the pitch of the helical grooves 17. The total amount that the shafts can be turned relative to one another is determined by the length and the pitch of the helical grooves. Depending on the amount of relative angular movement of the shafts that is needed for the desired control function, it is ordinarily sufficient for the helical grooves to extend circumferentially approximately 45° to 90° in the length of the grooved portion of the hub 7.

In operation, the inner shaft 1 is driven by means of pulley 5 and belts 6 and the outer shaft 2 normally rotates with the inner shaft at the same speed by reason of the engagement of the rollers 16 in the helical grooves 17 of the hub 7. When it is desired to shift the angular phase relation between the shafts to perform a control function on the impeller or other device mounted on the lower ends of the shafts, the collar 10 and hence the hub 7 are moved vertically by means of the lever 12 so that the skirt 15 and hence the outer shaft 2 are moved angularly with respect to the inner shaft by reason of engagement of the rollers 16 in the helical grooves 17 of the hub 7. As this angular movement occurs concurrently with the rotational movement of the inner shaft 1, it will be seen that during the interval of time that the angular movement is taking place the outer shaft will be rotated either faster or slower than the inner shaft depending on whether the angular movement is additive or subtractive. When the selected new vertical position of the hub 7 has been reached, the outer shaft will resume its rotation at the same speed as the inner shaft. It will be noted that the shafts 1 and 2 do not move axially relative to one another and that in effecting a phase shaft axial thrust is applied by the collar 10 only to the hub 7. Hence no special thrust bearings need be provided for the shafts.

In accordance with the invention there are also provided indicating means for indicating, for example visually, the relation of the shafts to one another and thereby indicating the state of the control function effected by the relative movement of the shafts.

The indicator of FIG. 1 is the simplest type. Since the phase displacement of the two shafts 1, 2 is caused by the axial movement of the collar 10, a pointer 50 may be attached to the collar and a scale 52 is mounted near the pointer. This scale is then calibrated in degrees of phase displacement as shown.

FIGS. 3 and 3a show the collar 10 provided with a different indicating means. An arm 52 carries a longitudinally variable shaded screen 54 disposed between a photocell 56 and a light source 58. The screen 54 has a progressively graduated transparency, the closely spaced lines nearer the top part of the screen 54 indicating less transparency. Therefore, as the screen 54 is raised or lowered by arm 52 and which is controlled by collar 10 the output of the cell 56 will be an indication of the phase displacement.

FIGS. 4 and 4a show the collar 10, with an arm 60 attached to it and a rack 62 attached to arm 60. The rack 62 engages a pinion gear 64 which has a circularly variable shaded screen 66 interposed between the cell 56 and light source 58. Again, the closely spaced lines represent less transparency. Thus as the collar 10 is raised and lowered, the arm 60 raises or lowers the rack 62, rotating the gear 64 and the screen 66. The output from the cell 56 gives an indication of the phase displacement.

FIG. 5 shows the two shafts 1 and 2 but here the shifting of the shafts to effect a control function is achieved by means fully disclosed in my beforementioned copending application. A member 74 on the inner shaft carries a cam 75 which operates a push-rod 77. This push-rod will move a screen 78 which controls the light reaching the cell 56 from the bulb 58.

An electrical measuring circuit illustrated in FIG. 6 is suitable for an indicating means of the kind shown in FIGS. 3, 4 and 5. A transformer 108 feeds two circuits: the lighting circuit and the measuring circuit. The lighting circuit comprises a lamp 58 and a current regulating tube 109 which is required to maintain a fixed lighting, independent of feed voltage fluctuations. The measuring circuit comprises a full wave rectifier system 111, a filtering capacity 112, a voltage regulator represented by a resistance 113 and a regulator tube 114. A voltage divider 115 allows adjustment of the voltage supplied to the photosensitive cell 56, while the milliammeter 116 measures the current flowing through the cell.

The lighting variations of the cell 56 according to the position of screen modify its resistance. Indication of the milliammeter is therefore proportionate to dephasing between shafts 1 and 2. As the current flow through the cell is very low, the cell may be positioned at a great distance from the indicator represented by the milliammeter 116. This enables remote and precision measurement of the dephasing between the two shafts.

While preferred embodiments of the invention have been shown and described by way of example, it will be understood that modifications may be made in details of construction.

What I claim is:

1. Means for driving two concentric shafts normally at the same speed and for shifting the phase relation between said shafts to perform a control function comprising:

rotating drive means;
first coupling means coupling a first one of said shafts with said drive means to rotate therewith;
a hub slidably, non-rotatably and concentrically mounted to said first shaft having at least one outer helical groove concentric with said first shaft;
second coupling means for coupling said second shaft with said hub comprising, means rigidly connected with said second shaft, and follower means for slidably communicating with said groove and mounted to said rigidly connected means;
means for controlling the axial displacement of said hub with respect ot said first shaft;
whereby as the axial displacement of the hub is changed, said follower means will follow said helical groove thereby changing the phase relation between said first and second shafts.

2. A device as in claim 1 wherein said first shaft has at least one axial groove along the outer surface thereof; said hub having at least one axial inner projection communicating with said axial groove; whereby the before said slidable, non-rotatable and concentric mounting of said hub to said first shaft is achieved; said rigidly connected means comprises a bell shaped skirt enclosing said first shaft and said hub; said follower means comprises a first ball bearing assembly having an inner race connected to the wide portion of said bell shaped skirt and an outer race coupled to the sides of said hub outer groove; and said control means comprises a second ball bearing assembly having its inner race connected to said hub, and a lever coupled to the outer race of said second assembly.

3. A device in accordance with claim 1 further comprising a photoelectric cell, a light source illuminating said cell, a movable screen between said light source and cell, means for moving said screen in accordance with the phase relation of said first and second shafts to vary the illumination of said cell by said light source, and indicating means controlled by said cell.

4. A device in accordance with claim 3 wherein said screen has variable translucent shading.

5. In combination with two concentric shafts having a means for shifting the relative positions of said shafts with respect to one another, the improvement comprising a movable screen, means for moving said screen in accordance with the relative positions of said shafts, a photoelectric cell on one side of said screen, a light source on the other side of said screen, and indicating means controlled by said cell.

6. A device as in claim 5 wherein said screen has progressively varied translucent shading.

7. A device in accordance with claim 4 or 6 wherein said variable shading is longitudinally disposed and said moving means longitudinally moves said screen.

8. A device as in claim 4 or 6 wherein said screen shading is circularly disposed and said moving means rotatively moves said screen.

9. A device in accordance with claim 1 further comprising: a pointer coupled to said hub and a scale proximate said pointer, whereby the pointer indicates on said scale the phase displacement of said shafts as said hub is axially displaced.

References Cited
UNITED STATES PATENTS

| | | | |
|---|---|---|---|
| 755,416 | 3/1904 | Tuckfield | 74—57 |
| 1,158,698 | 11/1915 | Loomis | 310—79 |
| 1,236,732 | 8/1917 | Mason | 310—79 |
| 2,871,705 | 2/1959 | Kerner | 74—57 |

FRED C. MATTERN, Jr., Primary Examiner

W. S. RATLIFF, Jr., Assistant Examiner

U.S. Cl. X.R.

74—89.14